(12) United States Patent
Ren et al.

(10) Patent No.: US 11,255,720 B2
(45) Date of Patent: Feb. 22, 2022

(54) FIXING STRUCTURE FOR FIXING REFLECTOR TO A PHOTOSENSITIVE DETECTING ASSEMBLY AND DEVICE FOR DETECTING DISPLAY BRIGHTNESS

(71) Applicant: BOE TECHNOLOGY GROUP CO., LTD., Beijing (CN)

(72) Inventors: Yan Ren, Beijing (CN); Junmin Sun, Beijing (CN); Lei Cao, Beijing (CN); Zifeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 496 days.

(21) Appl. No.: 16/346,518

(22) PCT Filed: Oct. 22, 2018

(86) PCT No.: PCT/CN2018/111223
§ 371 (c)(1),
(2) Date: Apr. 30, 2019

(87) PCT Pub. No.: WO2019/085783
PCT Pub. Date: May 9, 2019

(65) Prior Publication Data
US 2021/0364349 A1 Nov. 25, 2021

(30) Foreign Application Priority Data
Oct. 31, 2017 (CN) .......................... 201711046172.2

(51) Int. Cl.
*G02F 1/133* (2006.01)
*G01J 1/04* (2006.01)
*G02B 7/182* (2021.01)

(52) U.S. Cl.
CPC .......... *G01J 1/0403* (2013.01); *G01J 1/0414* (2013.01); *G02B 7/182* (2013.01)

(58) Field of Classification Search
CPC .......... G02F 1/133608; G02F 2201/46; G02F 2201/58; G09G 3/00
(Continued)

(56) References Cited

U.S. PATENT DOCUMENTS

| 4,025,162 A | 5/1977 | Yagi |
| 4,806,752 A * | 2/1989 | Fischer ................. G01D 11/30 |
| | | 250/231.14 |
| 2009/0140656 A1 | 6/2009 | Kohashikawa et al. |

FOREIGN PATENT DOCUMENTS

| CN | 201576145 U | 9/2010 |
| CN | 102800250 A | 11/2012 |

(Continued)

OTHER PUBLICATIONS

International Search Report and Written Opinion for Application No. PCT/CN2018/111223, dated Oct. 31, 2017, 11 pages.

(Continued)

*Primary Examiner* — Que Tan Le
(74) *Attorney, Agent, or Firm* — Brooks Kushman P.C.

(57) ABSTRACT

A fixing structure for fixing a reflector and a device for detecting a display brightness are provided. The fixing structure is configured to fix a reflector to a photosensitive detecting assembly; and the fixing structure includes at least one clamping unit configured to clamp and fix the reflector. Each clamping unit includes: a first support, including a first clamping arm configured to support a first surface of the reflector; and a second support, including a second clamping arm configured to press on a second surface of the reflector facing away from the first surface.

20 Claims, 4 Drawing Sheets

(58) Field of Classification Search
USPC ..................................... 250/239, 221, 214.1
See application file for complete search history.

(56) References Cited

FOREIGN PATENT DOCUMENTS

| | | |
|---|---|---|
| CN | 104162583 A | 11/2014 |
| CN | 204477816 U | 7/2015 |
| CN | 207409239 U | 5/2018 |
| JP | 2002139730 A | 5/2002 |

OTHER PUBLICATIONS

Extended European Search Report for European Application No. 18869458.2, dated Jul. 14, 2021, 6 pages.

* cited by examiner

FIXING STRUCTURE FOR FIXING REFLECTOR TO A PHOTOSENSITIVE DETECTING ASSEMBLY AND DEVICE FOR DETECTING DISPLAY BRIGHTNESS

CROSS-REFERENCE TO RELATED APPLICATIONS

This application is the U.S. national phase of PCT Application No. PCT/CN2018/111223 filed on Oct. 22, 2018, which claims priority to Chinese Patent Application No. 201711046172.2 filed on Oct. 31, 2017, which are incorporated herein by reference in their entireties.

TECHNICAL FIELD

The present disclosure relates to the field of display technology, and in particular to a fixing structure for fixing a reflector and a device for detecting a display brightness.

BACKGROUND

For displays in some special field, such as medical surgical displays, a brightness of a screen needs to be detected. In view of the different brightnesses, a display effect is adjusted or amended based on an algorithm, so as to ensure the best display effect. Thus, backlight brightnesses of the displays are required to be detected. However, devices related to detecting the backlight brightnesses often have unstable detection values.

SUMMARY

Technical solutions are provided by the present disclosure as followed.

In a first aspect, a fixing structure for fixing a reflector is provided by embodiments of the present disclosure, which is configured to fix the reflector to a photosensitive detecting assembly. The fixing structure includes at least one clamping unit configured to clamp and fix the reflector, and each clamping unit includes: a first support, including a first clamping arm configured to support a first surface of the reflector; and a second support, including a second clamping arm configured to press on a second surface of the reflector opposite to the first surface.

In a possible embodiment of the present disclosure, the second clamping arm is movable relative to the first clamping arm between a first position and a second position. In the case that the second clamping arm is moved to the first position, the second clamping arm is laminated and pressed on the first clamping arm to cooperate with the first clamping arm to clamp and fix the reflector; and in the case that the second clamping arm is moved to the second position away from the first clamping arm, the reflector is released.

In a possible embodiment of the present disclosure, the first support further includes a first support post fixed on a circuit board of the photosensitive detecting assembly, and the first clamping arm is arranged at an end of the first support post away from the circuit board. The second support further includes a second support post fixed on the circuit board, the second clamping arm is arranged at an end of the second support post away from the circuit board, and the second clamping arm is movably coupled to the second support post and is movable relative to the second support post.

In a possible embodiment of the present disclosure, the first support is of an L-shaped plate structure, in which the first support post is a first support plate arranged perpendicularly to the circuit board, and the first clamping arm is a second support plate parallel to the circuit board.

In a possible embodiment of the present disclosure, the second support post and the second clamping arm are coupled by a pivot, the second support further includes a rotary driving mechanism configured to drive the second clamping arm to rotate about the pivot, and the rotary driving mechanism is coupled to the second clamping arm.

In a possible embodiment of the present disclosure, the second support post is of a hollow cylindrical structure, the second clamping arm includes a first end coupled to the second support post and a second end opposite to the first end, and a pushing surface is arranged at the first end of the second clamping arm. The rotary driving mechanism includes:

a pushrod, in which the pushrod passes through the circuit board of the photosensitive detecting assembly and the second support post that is hollow, and a first end of the pushrod protrudes to a side of the circuit board away from the second support post, a second end of the pushrod abuts against a pushing surface of the second support post, and the pushrod and the first clamping arm are respectively located on opposite sides of the pivot; and a pushrod moving mechanism configured to drive the pushrod to move in a direction approaching or away from the second clamping arm, where the pushrod moving mechanism is coupled to the first end of the pushrod;

in the case that the pushrod moving mechanism pushes the pushrod in a direction approaching the second clamping arm, the pushrod pushes the pushing surface to rotate the second clamping arm about the pivot to the first position, in such a manner that the rotated second clamping arm is laminated and pressed the second clamping arm on the first clamping arm; and in the case that the pushrod moving mechanism pushes the pushrod in a direction away from the second clamping arm, the pushing surface of the second clamping arm is repositioned to the second position away from the first clamping arm.

In a possible embodiment of the present disclosure, the rotary driving mechanism further includes a reposition member configured to reposition the second clamping arm to the second position, and the reposition member includes a reposition torsion spring arranged on the pivot.

In a possible embodiment of the present disclosure, the pushrod moving mechanism includes: a driving cylinder arranged on the side of the circuit board away from the second support post; and a piston plate driven to reciprocate by the driving cylinder, in which the first end of the pushrod is fixed to the piston plate.

In a possible embodiment of the present disclosure, the driving cylinder is electrically coupled to the circuit board of the photosensitive detecting assembly and operates according to a powered state of the circuit board.

In a possible embodiment of the present disclosure, the second clamping arm is a cylindrical structure, and the second end of the second clamping arm has a pointed structure.

In a possible embodiment of the present disclosure, a side peripheral face of the cylindrical structure of the second clamping arm approaching to the first clamping arm is of a planar structure.

In a possible embodiment of the present disclosure, a first magnetic member is arranged on the first clamping arm, and the second clamping arm is provided with a second magnetic member, in which the second magnetic member and the first magnetic member are enabled to be attracted to each other.

In a possible embodiment of the present disclosure, the first magnetic member is a first electromagnet; the second magnetic member is an iron block arranged on the second clamping arm; or the second magnetic member is a second electromagnet arranged on the second clamping arm, in which a magnetic polarity of the second electromagnet is opposite to a magnetic polarity of the first electromagnet; or the second clamping arm is an iron clamping arm. The first support is made of a conductive material, and the electromagnet is electrically coupled to a circuit board of the photosensitive detecting assembly through the first support.

In a possible embodiment of the present disclosure, the fixing structure includes at least three clamping units, the at least three clamping units are arranged around a brightness sensor of the photosensitive detecting assembly, in which the brightness sensor is arranged on the circuit board of the photosensitive detecting assembly.

In a second aspect, a device for detecting a display brightness is provided by embodiments of the present disclosure, which is configured to detect a backlight brightness of a display. The device for detecting a display brightness includes a photosensitive detecting assembly and the fixing structure according to the fixing structure as described above; the fixing structure is configured to fix the reflector to the photosensitive detecting assembly; and the photosensitive detecting assembly includes a circuit board and a brightness sensor arranged on the circuit board.

DETAILED DESCRIPTION

Figure 1:
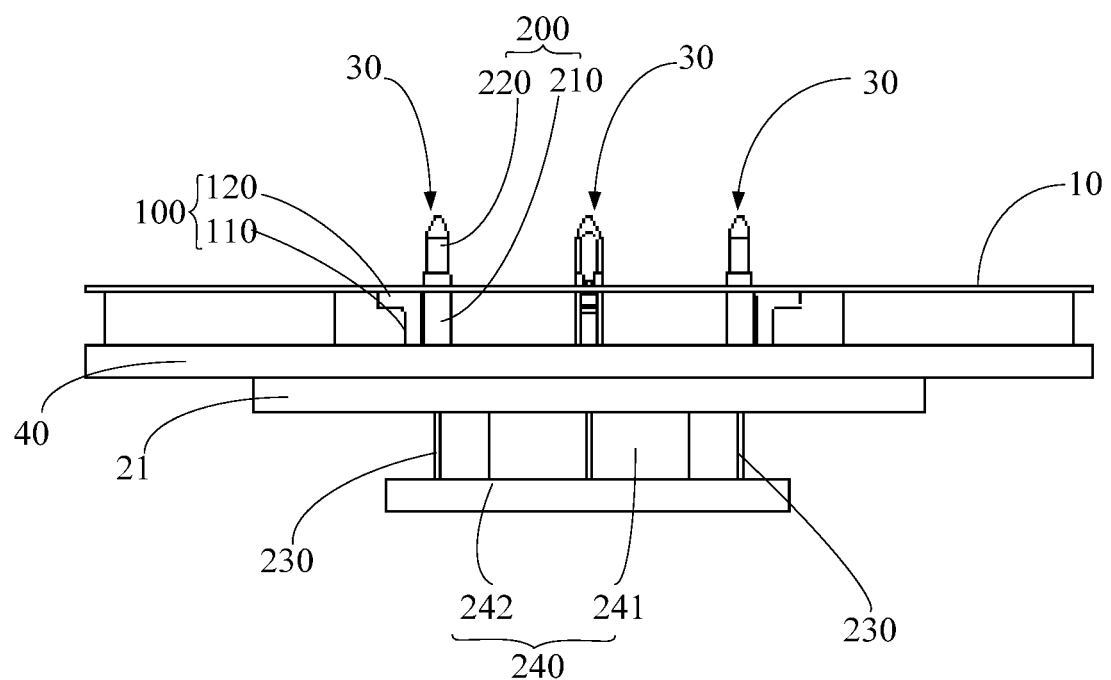
FIG. 1 is a structural schematic view of a fixing structure in a second state in the case that the fixing structure is used to detect a brightness of a display according to some embodiments of the present disclosure.

In order to make the objects, technical solutions and advantages of the embodiments of the present disclosure clearer, the technical solutions of the embodiments of the present disclosure will be clearly and completely described below in conjunction with the drawings of the embodiments of the present disclosure. It is apparent that the described embodiments are a part of the embodiments of the present disclosure, and not all of them. Based on the described embodiments of the present disclosure, all other embodiments obtained by those skilled in the art fall within the scope of the disclosure.

Typically, a backlight brightness of a display is detected by a photosensitive detecting assembly. When detecting the backlight brightness, a hole is formed in a backplate of a backlight module, a brightness sensor is arranged in the hole of the backplate to detect a brightness after the backlight passes through a reflector, and a brightness of a display screen is calculated according to the brightness after the backlight passes through a reflector. Thus, a value of the brightness detected after the backlight has passed through the reflector is required to be very accurate. However, the reflector may shrink or expand due to a backlight temperature, and a distance between the reflector and the brightness sensor may be changed, so that a detecting value is changed and unstable, and a final detecting result is adversely affected.

The present disclosure is to provide a fixing structure for fixing a reflector and a device for detecting a display brightness, which can keep a distance between the reflector of the backlight module and the photosensitive detecting assembly relatively constant, and solve the problem of inaccurate data detected by the brightness sensor that is caused by the changeable distance between the reflector and the brightness sensor due to deformation of the reflector and the like.

In view of the problem of inaccurate detected data due to the deformation of the reflector and the like in the related art when the backlight brightness of the display is detected, a fixing structure and a device for detecting a display brightness provided by the present disclosure can keep the distance between the reflector of the backlight module and the photosensitive detecting assembly relatively constant, thereby improving data accuracy.

The fixing structure according to the embodiments of the present disclosure is arranged between the photosensitive detecting assembly and the reflector of the backlight module in the display and is configured to fix the photosensitive detecting assembly and the reflector, so as to maintain a preset distance between the reflector and the photosensitive detecting assembly. The fixing structure includes at least one clamping unit for clamping and fixing the reflector. The clamping unit is arranged on the photosensitive detecting assembly and has a first state and a second state. In the first state, the clamping unit clamps the reflector; in the second state, the clamping unit releases the reflector.

Based on the fixing structure and the display brightness detecting assembly according to the present disclosure, in detecting the backlight brightness of the display screen, the fixing structure may be arranged between the reflector of the backlight module and the photosensitive detecting assembly, and the clamping unit of the fixing structure is adjusted to convert from the second state to the first state. The clamping unit clamps and fixes the reflector, thereby fixing the reflector and preventing the reflector from being deformed. Thus, the distance between the reflector of the backlight module and the photosensitive detecting assembly keeps relatively unchanged, so that the problem that the distance between the reflector and the brightness sensor is changed due to deformation of the reflector and the like in the related art, which further causes data detected by the brightness sensor to be inaccurate, can be solved. Thus, a detecting accuracy of the photosensitive detecting assembly is improved and a validity of the data can be ensured. After the detection is completed, the clamping unit of the fixing structure may be converted from the first state to the second state, and the reflector is released to enable the fixing structure to be removed from the reflector.

It should be noted that the fixing structure provided by the present disclosure can not only be applied in the case of maintaining the preset distance between the photosensitive detecting assembly and the reflector when the backlight brightness of the display is detected, but also can be applied in other cases. For example, the fixing structure provided by the present disclosure can be applied when it is required to keep a distance between two planes constant.

An optional embodiment of the fixing structure provided by the present disclosure will be described below by taking the fixing structure applied in detecting the backlight brightness of the display as an example.

As shown from FIG. 1 to FIG. 8, in some embodiments of the present disclosure, the reflector 10 includes a first surface and a second surface which are opposite to each other. The photosensitive detecting assembly includes a circuit board 21 and a brightness sensor 22 arranged on the circuit board 21.

Each of clamping units 30 includes:

a first support 100, where the first support 100 includes a first support post 110 fixed on a circuit board 21, and a first clamping arm 120 that is arranged on an end of the first support post 110 away from the circuit board 21, and configured to support the first surface of the reflector 10; and a second support 200, where the second support 200 includes a second support post 210 fixed on a circuit board 21, and a second clamping arm 220 that is arranged on an end of the second support post 210 away from the circuit board 21, and configured to press on the second surface of the reflector 10; and the second clamping arm 220 is movably coupled to the second support post 210 and movable relative to the second support post 210.

In the first state, the second clamping arm 220 is laminated and presses on the first clamping arm 120 to cooperate with the first clamping arm 120 to clamp and fix the reflector 10; and in the second state, the second clamping arm 220 is moved to a predetermined position other than a position of the first clamping arm 120 to release the reflector 10.

Before illustrating the above embodiments, it should be noted that the fixing structure provided by one or more embodiments of the present disclosure may be used for detecting the backlight brightness of the display. When detecting the backlight brightness, a hole is formed in a backplate 40 of the backlight module, and the brightness sensor 22 may be placed in the hole on the backplate 40 (a light board 20 is between the backplate 40 and the reflector 10). A through-hole is formed in the reflector 10 so that the clamping unit 30 passes through the through-hole of the reflector 10 to clamp the first surface and the second surface of the reflector 10, which prevents the reflector 10 from being deformed, thereby detecting the brightness of the backlight after having passed through the reflector 10. The first surface and the second surface of the reflector 10 are opposite to each other.

In addition, in the above embodiments, the clamping unit 30 is implemented by using two supports. One of the supports is a first support 100 fixed on the circuit board 21 of the photosensitive detecting assembly, the first support post 110 of the first support 100 has a function of supporting, and the first clamping arm 120 on a top end of the first support post 110 supports the first surface of the reflector 10. The other of the supports is a second support 200 fixed on the circuit board 21 of the photosensitive detecting assembly, a height of the second support post 210 of the second support 200 should be slightly higher than a height of the first support post 110, so that a top end of the second support post 210 is able to pass through the through-hole formed in the reflector 10 and insert above the second surface of the reflector 10; thereby, the second clamping arm 220 on the top end of the second support post 210 can be extended onto the second surface of the reflector 10.

Figure 2:
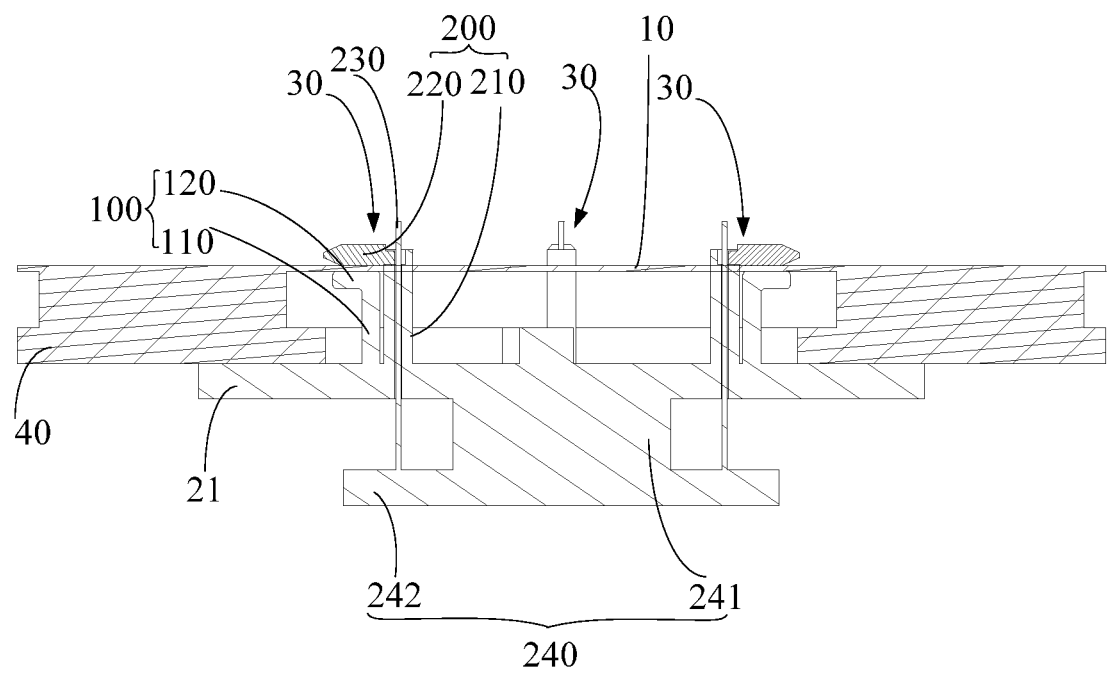
FIG. 2 is a structural schematic view of a fixing structure in the first state in the case that the fixing structure is used to detect a brightness of a display according to some embodiments of the present disclosure.
Figure 3:
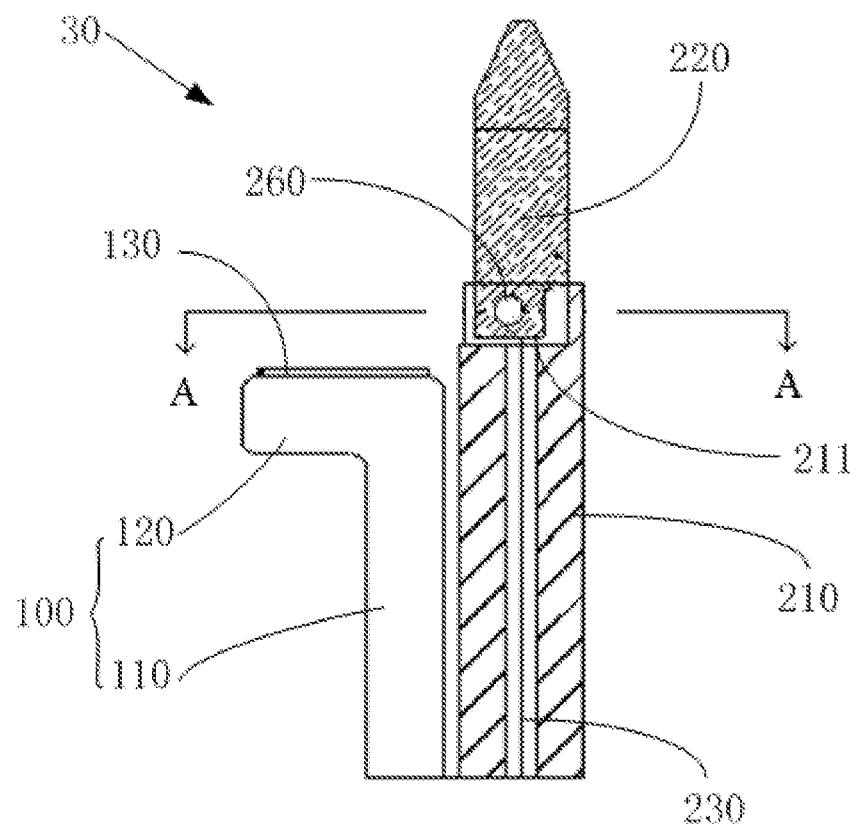
FIG. 3 is a schematic plan view of each clamping unit of a fixing structure according to some embodiments of the present disclosure.
Figure 4:
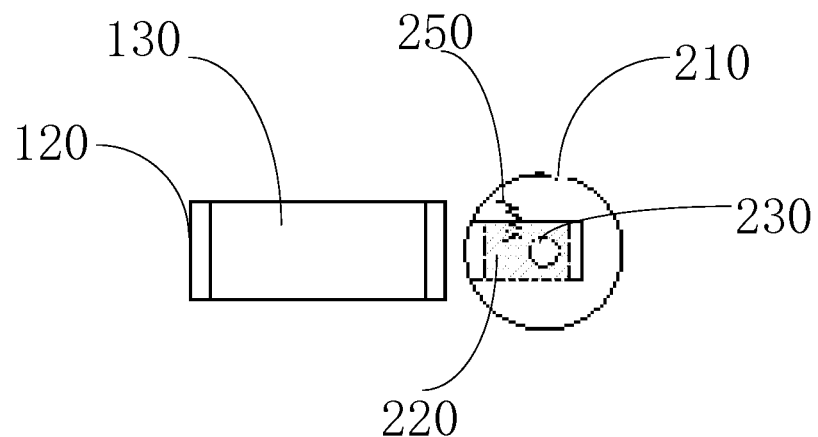
FIG. 4 is a cross-sectional view taken along a line A-A of FIG. 3.
Figure 5:
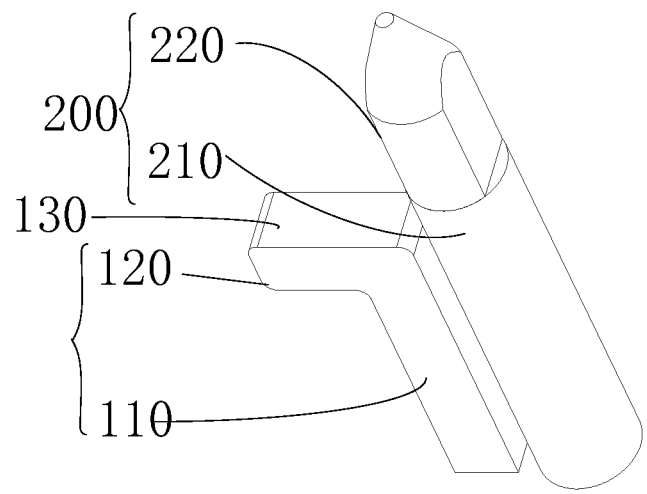
FIG. 5 is a perspective structural view of a clamping unit of a fixing structure in a second state according to some embodiments of the present disclosure.
Figure 6:
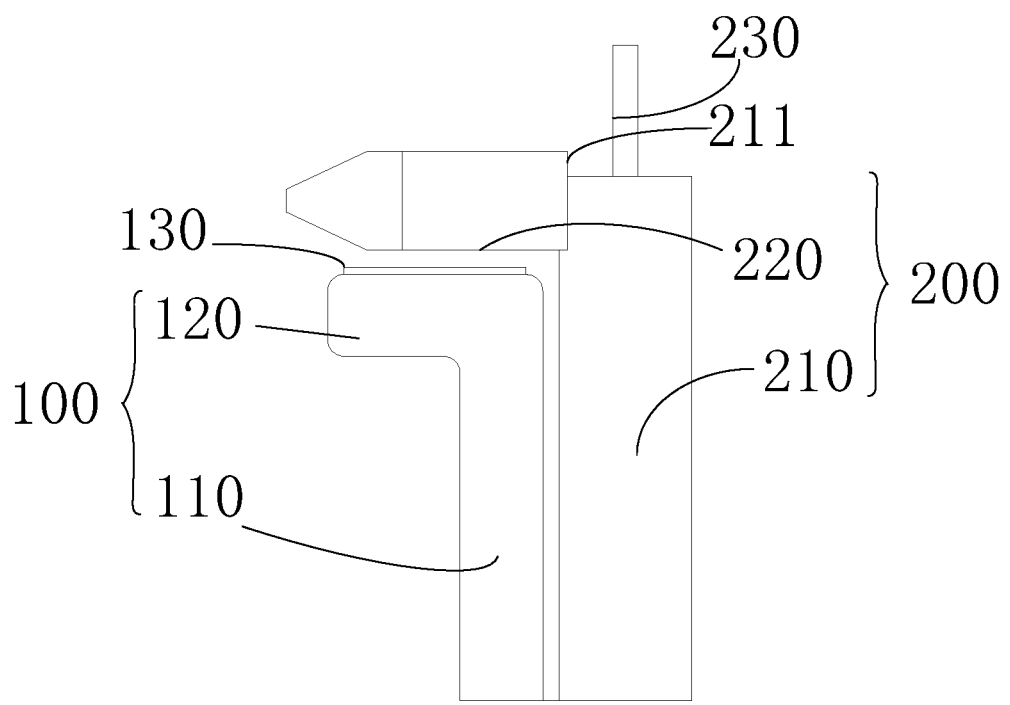
FIG. 6 is a perspective structural view of a clamping unit of a fixing structure in a first state according to some embodiments of the present disclosure.

During detecting the backlight brightness, first, the circuit board 21 and the brightness sensor 22 of the photosensitive detecting assembly are moved into the hole of the backplate 40, and the second clamping arm 220 is adjusted to be in the second state; at this time, the second clamping arm 220 and the first support post 110 may be in parallel or may have a slightly tiny angle; the first support post 110 and the second support post 210 are moved upward, so that the second clamping arm 220 passes through the through-hole opened in the reflector 10 and inserts above the second surface of the reflector 10, and the first support post 110 and the first clamping arm 120 support and are under the first surface of the reflector 10 (as shown in FIG. 1, FIG. 3 and FIG. 5); then, the second clamping arm 220 is controlled to move to the first state, so that the second clamping arm 220 moves to be perpendicular to the second support post 210 and is laminated and pressed on the first clamping arm 120, thereby cooperating with the first clamping arm 120 to clamp and fix the reflector 10; at this time, the backlight brightness is detected by the brightness sensor 22 (as shown in FIG. 2 and FIG. 6). When the detection is completed, the second clamping arm 220 is controlled to move to the second state, so that the second clamping arm 220 returns to the predetermined position other than the position of the first clamping arm 120; at this time, the second clamping arm 220 and the first support post 110 may be in a same straight line or have a slightly tiny angle (as shown in FIG. 1 and FIG. 5); and then, the first support post 110 and the second support post 210 are moved downward, so that the second clamping arm 220 is retracted from the through-hole in the reflector 10 to complete the detection of the backlight brightness.

It should be noted that, in above embodiments, the clamping unit 30 adopts a manner that two support posts and two clamping arms respectively cooperate with each other. The support post may support between the circuit board 21 and the reflector 10, while maintaining the reflector 10 and the circuit board 21 in a predetermined distance. The two clamping arms may clamp the reflector 10 to prevent the reflector 10 from being deformed. In practical applications, a specific structure of the clamping unit 30 may not be limited as described above. For example, the clamping unit 30 may also apply a support post structure, and two clamping arms and the like, which are enabled to move relative to each other, and are arranged at the top end of the support post.

In addition, as shown in FIG. 3 and FIG. 6, in optional embodiments provided by the present disclosure, the first support 100 is an L-shaped plate structure, in which the first support post 110 is a first support plate 111 arranged perpendicular to the circuit board 21, and the first clamping arm 120 is a second support plate 112 parallel to the circuit board 21. This structure is simple and easy to be formed and made. Of course, it should be understood that, in the practical application, the specific structure of the first support 100 is not limited as described above. For example, the first support 100 may also be a support block having a support surface thereon. The specific structure of the first support 100 will not be listed all.

In addition, in the embodiments provided by the present disclosure, as shown in FIG. 3, the second support post 210 and the second clamping arm 220 are connected by a pivot 260; and the second support 200 further includes a rotary driving mechanism for driving the second clamping arm 220 to rotate about the pivot 260. The rotary driving mechanism is connected to the second clamping arm 220.

According to the above embodiments, the second support post 210 and the second clamping arm 220 are rotatably connected to each other. With the second clamping arm 220 rotating relative to the second support post 210, the second clamping arm 220 may switch between the first state and the second state. In the first state, central axes of the second clamping arm 220 and the second support post 210 are on a same line or have a slight angle. In the second state, the second clamping arm 220 is enabled to be turned relative to the second support post 210 to the side where the first clamping arm 120 is located, and the turned second clamping arm 220 is perpendicular to the second support post 210, and is laminated and pressed on the first clamping arm 120.

Of course, it should be understood that, in the practical application, the manner of the movable connection between the second clamping arm 220 and the first clamping arm 120 is not limited to this type of a rotatable connection, and may be other ways, which will not be listed all.

In addition, in the embodiments provided by the present disclosure, as shown in FIGS. 1 to 6, the second support post 210 is a hollow cylindrical structure; and the second clamping arm 220 includes a first end connected to the second support post 210 and a second end opposite to the first end. A pushing surface 211 is arranged at the first end of the second clamping arm 220.

The rotary driving mechanism includes: a pushrod 230, a pushrod moving mechanism 240 and a reposition member.

The pushrod 230 passes through the circuit board 21 and the second support post 210 which is hollow, and a first end of the pushrod 230 protrudes to a side of the circuit board 21 away from the second support post 210, a second end of the pushrod 230 abuts against the pushing surface 211 of the second support post 210, and the pushrod 230 and the first clamping arm 120 are respectively located on opposite sides of the pivot 260.

The pushrod moving mechanism 240 is configured to drive the pushrod 230 to move in a direction approaching or away from the second clamping arm 220, and the pushrod moving mechanism 240 is coupled to the first end of the pushrod 230.

The reposition member is configured to reposition the second clamping arm 220 to the second position; and the reposition member includes a reposition torsion spring 250 arranged on the pivot 260.

In the first state, the pushrod moving mechanism 240 pushes the pushrod 230 in a direction approaching the second clamping arm 220. The pushrod 230 pushes the pushing surface 211, so as to rotate the second clamping arm 220 about the pivot 260, and the rotated second clamping arm 220 is laminated and pressed on the first clamping arm 120.

In the second state, the pushrod moving mechanism 240 pulls back the pushrod 230 in a direction away from the second clamping arm 220 to enable the pushing surface 211 of the second clamping arm 220 to be repositioned to a predetermined position other than the position of the first clamping arm 120.

According to the above embodiments, the rotary movement of the second clamping arm 220 is completed by using the pushrod 230. The pushrod 230 is capable of moving up and down inside the second support post 210, and a top end of the pushrod 230 abuts against the pushing surface 211 on a bottom end of the second clamping arm 220. During performing the detection, after the circuit board 21 of the photosensitive detecting assembly is placed into the hole of the backplate 40, the pushrod 230 is pushed toward the second clamping arm 220 by the pushrod moving mechanism 240. That is, in the case that the pushrod 230 moves upward, the pushrod 230 is pushed to the pushing surface 211 on the bottom end of the second clamping arm 220. Since the pushrod 230 and the first clamping arm 120 are respectively located on opposite sides of the pivot 260, the second clamping arm 220 may rotate around the pivot under the pushing of the pushrod 230. Thus, the second clamping arm 220 is turned over to the side where the first clamping arm 120 is located, and is perpendicular to the second support post 210, and finally is laminated and pressed on the first clamping arm 120. When the detection is completed, the pushrod 230 is moved away from the second clamping arm 220. That is, in the case that the pushrod 230 moves downward, the second clamping arm 220 is turned over in a direction away from the first clamping arm 120 under an elastic action of the reposition spring, and finally returns to a position on the same line as the second support post 210 or having a slight angle relative to the second support post 210, so as to exit from the through-hole in the reflector 10.

In addition, in one or more embodiments provided by the present disclosure, the pushrod 230 is a probe structure.

In addition, in one or more embodiments provided by the present disclosure, as shown in FIG. 1 and FIG. 2, the pushrod moving mechanism 240 includes: a driving cylinder 241 arranged on the side of the circuit board 21 away from the second support post 210; and a piston plate 242 driven to reciprocate by the driving cylinder 241, and the first end of the pushrod 230 is fixed onto the piston plate 242.

Based on the above solutions, the up and down movement of the pushrod 230 is implemented by the piston plate 242 and the driving cylinder 241 arranged on the side of the circuit board 21 away from the second support post 210, and it is an ingenious design. Since a distance between the circuit board 21 of the photosensitive detecting assembly and the reflector 10 is short, it is inconvenient to set a moving structure such as the pushrod 230. In the above embodiments, the piston plate 242 and the driving cylinder 241 for moving the pushrod 230 are arranged on the side of the circuit board 21 away from the second support post 210, so as to control the movement of the second clamping arm 220, thereby solving the problem of an insufficient space, and making it easily operated.

Of course, it should be understood that, in practical applications, the specific structure of the rotary driving mechanism for driving the second clamping arm 220 to rotate is not limited as described above.

In addition, in one or more embodiments provided by the present disclosure, the driving cylinder 241 is electrically coupled to the circuit board 21 of the photosensitive detecting assembly and operates according to a powered state of the circuit board 21.

Based on the above solutions, the driving cylinder 241 can be controlled by an on/off state of the circuit board 21 of the photosensitive detecting assembly. In the case that the circuit board 21 is in a power-on state, and a detection of the backlight brightness is started, the driving cylinder 241 simultaneously controls the pushrod 230 to move upward, and pushes the second clamping arm 220 to turn over to the side where the first clamping arm 120 is located to clamp and fix the reflector 10. In the case that the circuit board 21 is in a power-off state, the driving cylinder 241 simultaneously controls the pushrod 230 to move downward, so that the second clamping arm 220 returns to the second state. Of course, it should be understood that the driving cylinder 241 may also be individually controlled.

In addition, in some embodiments of the present disclosure, as shown in FIG. 5 and FIG. 6, the second clamping arm 220 is of a cylindrical structure; and the second end of the second clamping arm 220 has a pointed structure.

Based on the above solutions, the top end of the second clamping arm 220 is designed as a pointed structure, to facilitate the second clamping arm 220 to insert into the through-hole of the reflector 10.

In addition, in one or more embodiments provided by the present disclosure, as shown in FIG. 5 and FIG. 6, a side peripheral face of the cylindrical structure of the second clamping arm 220 approaching to the first clamping arm 120 is of a planar structure.

Based on the above solutions, since a side face of the second clamping arm 220 approaching to the first clamping arm 120 may be laminated and pressed on the first clamping arm 120, the side face may be, for example, of a planar structure.

It should be noted that, in order to ensure that the first clamping arm 120 and the second clamping arm 220 do not damage the reflector 10 when clamp the reflector 10, elastic material layers may be arranged on faces of the first clamping arm 120 and the second clamping arm 220 respectively contacting with the reflector 10. For example, an elastic material layer is arranged on a support face of the first clamping arm 120 facing the reflector; an elastic material layer is arranged on a planar structure on the side peripheral face of the cylindrical structure of the second clamping arm 220 approaching to the first clamping arm 120.

In addition, in one or more embodiments provided by the present disclosure, as shown in FIGS. 3 to 6, a first magnetic member 130 is arranged on the first clamping arm 120; and the second clamping arm 220 is provided with a second magnetic member, in which the second magnetic member and the first magnetic member 130 are enabled to be attracted each other.

According to the above embodiment, both the first clamping arm 120 and the second clamping arm 220 are provided with magnetic members. In the case that the pushrod 230 upward pushes the second clamping arm 220 toward the direction of approaching the second clamping arm 220, the second clamping arm 220 is pushed by the pushrod 230 to turn over a certain angle toward the side of the first clamping arm 120 about the pivot 260. In this situation, the second clamping arm 220 is subjected to a magnetic attraction force from the first clamping arm 120. The magnetic attraction force is greater than a restoring force when the reposition spring is turned by 90 degrees. Therefore, the second clamping arm 220 fits tightly with the first clamping arm 120 to clamp and fixed the reflector 10.

In one or more embodiments provided by the present disclosure, the first magnetic member 130 is a first electromagnet; the second magnetic member is an iron block arranged on the second clamping arm 220; or the second magnetic member is a second electromagnet arranged on the second clamping arm 220, and a magnetic polarity of the second electromagnet is opposite to a magnetic polarity of the first electromagnet; or the second clamping arm 220 is an iron clamping arm. The first support 100 is made of a conductive material, and the first electromagnet is electrically coupled to the circuit board 21 of the photosensitive detecting assembly through the first support 100.

Based on the above solutions, the first magnetic member 130 on the first clamping arm 120 is an electromagnet, and the first support 100 is made of a conductive material, and supports the first magnetic member 130, which enables to the circuit board 21 of the photosensitive detecting assembly and the first magnetic member 130 to be electrically coupled. Thus, in the case that the circuit board 21 is powered on, the first electromagnet is powered on and is magnetic, and the driving cylinder 241 operates simultaneously, so that the second clamping arm 220 is pushed by the pushrod 230 and turned over to the side of the first clamping arm 120 by the magnetic force. When the detection is completed, the circuit board 21 is powered off, the first magnetic member 130 is powered off, the magnetic attraction force between the first clamping arm 120 and the second clamping arm 220 disappears, and the second clamping arm 220 is successfully returned to the position on the same line as the second support post 210 or having a slight angle relative to the second support post 210 under an action of the reposition spring.

Figure 7:
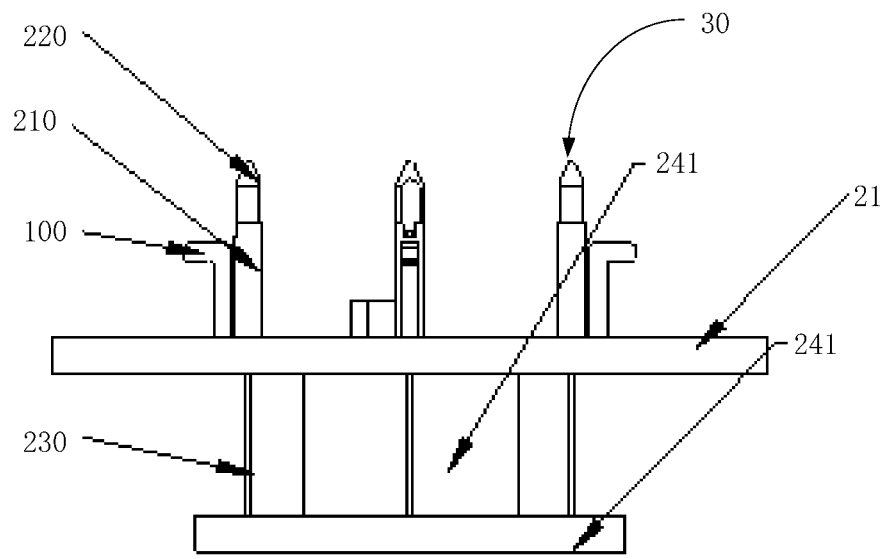
FIG. 7 is a perspective structural view of a fixing structure in a second state according to some embodiments of the present disclosure.
Figure 8:
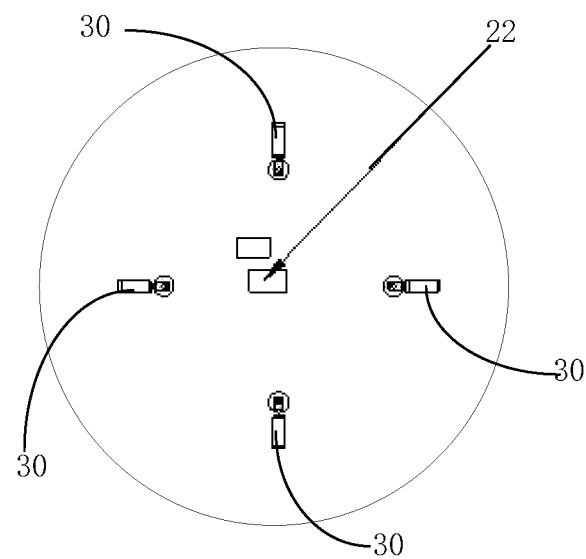
FIG. 8 is a top view of the fixing structure in FIG. 7.

It should be noted that, in other embodiments of the present disclosure, the magnetic member on the first clamping arm 120 and the second clamping arm 220 can be other manners, and are not limited as described above. An operating state of the first magnetic member 130 on the first clamping arm 120 can also be individually controlled. In addition, as shown in FIG. 7 and FIG. 8, in optional embodiments of the present disclosure, the fixing structure includes at least three clamping units 30, and the at least three clamping units 30 are arranged around the brightness sensor 22.

Based on the above solutions, arranging at least three clamping units 30 around the brightness sensor 22 is advantageous to prevent the reflector 10 from being deformed.

In addition, a device for detecting a display brightness, configured to detect a backlight brightness of a display, is provided by embodiments of the present disclosure. The device for detecting a display brightness includes a photosensitive detecting assembly and the fixing structure according to each of the embodiments of the present disclosure; the fixing structure is configured to fix a reflector 10 to the photosensitive detecting assembly; and the photosensitive detecting assembly includes a circuit board 21 and a brightness sensor 22 arranged on the circuit board 21.

The fixing structure and the device for detecting a display brightness are provided by the present disclosure. During detecting the backlight brightness of the display screen, the fixing structure is arranged between the reflector of the backlight module and the photosensitive detecting assembly to fix the reflector and prevent the reflector from being deformed. Thus, the distance between the reflector of the backlight module and the photosensitive detecting assembly keeps relatively unchanged, so that the problem that the distance between the reflector and the brightness sensor is changed due to deformation of the reflector and the like in the related art, which further causes data detected by the brightness sensor to be inaccurate, can be solved. Thus, a detecting accuracy of the photosensitive detecting assembly is improved and a validity of the data can be ensured.

The above embodiments are merely optional embodiments of the present disclosure. It should be noted that numerous improvements and modifications can be made by those skilled in the art without departing from the principle of the present disclosure, and these improvements and modifications shall also fall within the scope of the present disclosure.

What is claimed is:

1. A fixing structure configured to fix a reflector to a photosensitive detecting assembly, wherein the fixing structure comprises at least one clamping unit configured to clamp and fix the reflector, and each clamping unit comprises:
a first support comprising a first clamping arm configured to support a first surface of the reflector; and
a second support comprising a second clamping arm configured to press on a second surface of the reflector opposite to the first surface.

2. The fixing structure according to claim 1, wherein the second clamping arm is movable relative to the first clamping arm between a first position and a second position;
in the case that the second clamping arm is moved to the first position, the second clamping arm is laminated and pressed on the first clamping arm, to cooperate with the first clamping arm to clamp and fix the reflector; and
in the case that the second clamping arm is moved to the second position away from the first clamping arm, the reflector is released.

3. The fixing structure according to claim 2, wherein the first support further comprises a first support post fixed on a circuit board of the photosensitive detecting assembly, the first clamping arm is arranged at an end of the first support post away from the circuit board; and
the second support further comprises a second support post fixed on the circuit board, the second clamping arm is arranged at an end of the second support post away from the circuit board, and the second clamping arm is movably coupled to the second support post and is movable relative to the second support post.

4. The fixing structure according to claim 3, wherein the first support is of an L-shaped plate structure, wherein the first support post is a first support plate arranged perpendicularly to the circuit board, and the first clamping arm is a second support plate parallel to the circuit board.

5. The fixing structure according to claim 3, wherein the second support post and the second clamping arm are coupled by a pivot, the second support further comprises a rotary driving mechanism configured to drive the second clamping arm to rotate about the pivot, and the rotary driving mechanism is coupled to the second clamping arm.

6. The fixing structure according to claim 5, wherein the second support post is of a hollow cylindrical structure, the second clamping arm comprises a first end coupled to the second support post and a second end opposite to the first end, and a pushing surface is arranged at the first end of the second clamping arm;
the rotary driving mechanism comprises:
a pushrod, wherein the pushrod passes through the circuit board of the photosensitive detecting assembly and the second support post that is hollow, and a first end of the pushrod protrudes to a side of the circuit board away from the second support post, a second end of the pushrod abuts against the pushing surface of the second support post, and the pushrod and the first clamping arm are respectively located on opposite sides of the pivot; and
a pushrod moving mechanism configured to drive the pushrod to move in a direction approaching or away from the second clamping arm, wherein the pushrod moving mechanism is coupled to the first end of the pushrod;
in the case that the pushrod moving mechanism pushes the pushrod in a direction approaching the second clamping arm, the pushrod pushes the pushing surface, to rotate the second clamping arm about the pivot to the first position, in such a manner that the rotated second clamping arm is laminated and pressed on the first clamping arm; and
in the case that the pushrod moving mechanism pushes the pushrod in a direction away from the second clamping arm, the pushing surface of the second clamping arm is repositioned to the second position away from the first clamping arm.

7. The fixing structure according to claim 5, wherein the rotary driving mechanism further comprises a reposition member configured to reposition the second clamping arm to the second position, and the reposition member comprises a reposition torsion spring arranged on the pivot.

8. The fixing structure according to claim 6, wherein the pushrod moving mechanism comprises:
a driving cylinder arranged on the side of the circuit board away from the second support post; and
a piston plate driven to reciprocate by the driving cylinder, wherein the first end of the pushrod is fixed to the piston plate.

9. The fixing structure according to claim 8, wherein the driving cylinder is electrically coupled to the circuit board of the photosensitive detecting assembly, and operates according to a powered state of the circuit board.

10. The fixing structure according to claim 6, wherein the second clamping arm is a cylindrical structure, and the second end of the second clamping arm has a pointed structure.

11. The fixing structure according to claim 10, wherein a side peripheral face of the cylindrical structure of the second clamping arm approaching to the first clamping arm is of a planar structure.

12. The fixing structure according to claim 2, wherein a first magnetic member is arranged on the first clamping arm, and the second clamping arm is provided with a second magnetic member, wherein the second magnetic member and the first magnetic member are enabled to be attracted to each other.

13. The fixing structure according to claim 12, wherein the first magnetic member is a first electromagnet;
the second magnetic member is an iron block arranged on the second clamping arm; or the second magnetic member is a second electromagnet arranged on the second clamping arm, wherein a magnetic polarity of the second electromagnet is opposite to a magnetic polarity of the first electromagnet; or the second clamping arm is an iron clamping arm; and
the first support is made of a conductive material, and the first electromagnet is electrically coupled to a circuit board of the photosensitive detecting assembly through the first support.

14. The fixing structure according to claim 2, wherein the fixing structure comprises at least three clamping units, the at least three clamping units are arranged around a brightness sensor of the photosensitive detecting assembly, wherein the brightness sensor is arranged on a circuit board of the photosensitive detecting assembly.

15. A device for detecting a display brightness, configured to detect a backlight brightness of a display; wherein the device for detecting a display brightness comprises a photosensitive detecting assembly and a fixing structure;
wherein the fixing structure is configured to fix a reflector to the photosensitive detecting assembly; and the photosensitive detecting assembly comprises a circuit board and a brightness sensor arranged on the circuit board, wherein the fixing structure comprises at least one clamping unit configured to clamp and fix the reflector, and each clamping unit comprises:
a first support comprising a first clamping arm configured to support a first surface of the reflector; and
a second support comprising a second clamping arm configured to press on a second surface of the reflector opposite to the first surface.

16. The device according to claim 15, wherein the second clamping arm is movable relative to the first clamping arm between a first position and a second position;
in the case that the second clamping arm is moved to the first position, the second clamping arm is laminated and pressed on the first clamping arm, to cooperate with the first clamping arm to clamp and fix the reflector; and
in the case that the second clamping arm is moved to the second position away from the first clamping arm, the reflector is released.

17. The device according to claim 16, wherein the first support further comprises a first support post fixed on a circuit board of the photosensitive detecting assembly, the first clamping arm is arranged at an end of the first support post away from the circuit board; and
the second support further comprises a second support post fixed on the circuit board, the second clamping arm is arranged at an end of the second support post away from the circuit board, and the second clamping arm is movably coupled to the second support post and is movable relative to the second support post.

18. The device according to claim 17, wherein the first support is of an L-shaped plate structure, wherein the first support post is a first support plate arranged perpendicularly to the circuit board, and the first clamping arm is a second support plate parallel to the circuit board.

19. The device according to claim 17, wherein the second support post and the second clamping arm are coupled by a pivot, the second support further comprises a rotary driving mechanism configured to drive the second clamping arm to rotate about the pivot, and the rotary driving mechanism is coupled to the second clamping arm.

20. The device according to claim 19, wherein the second support post is of a hollow cylindrical structure, the second clamping arm comprises a first end coupled to the second support post and a second end opposite to the first end, and a pushing surface is arranged at the first end of the second clamping arm;
the rotary driving mechanism comprises:
a pushrod, wherein the pushrod passes through the circuit board of the photosensitive detecting assembly and the second support post that is hollow, and a first end of the pushrod protrudes to a side of the circuit board away from the second support post, a second end of the pushrod abuts against the pushing surface of the second support post, and the pushrod and the first clamping arm are respectively located on opposite sides of the pivot; and
a pushrod moving mechanism configured to drive the pushrod to move in a direction approaching or away from the second clamping arm, wherein the pushrod moving mechanism is coupled to the first end of the pushrod;
in the case that the pushrod moving mechanism pushes the pushrod in a direction approaching the second clamping arm, the pushrod pushes the pushing surface, to rotate the second clamping arm about the pivot to the first position, in such a manner that the rotated second clamping arm is laminated and pressed on the first clamping arm; and
in the case that the pushrod moving mechanism pushes the pushrod in a direction away from the second clamping arm, the pushing surface of the second clamping arm is repositioned to the second position away from the first clamping arm.

\* \* \* \* \*